US008754807B2

(12) United States Patent
Do et al.

(10) Patent No.: US 8,754,807 B2
(45) Date of Patent: Jun. 17, 2014

(54) TIME, FREQUENCY, AND LOCATION DETERMINATION FOR FEMTOCELLS

(75) Inventors: Ju-Yong Do, Stanford, CA (US); Guttorm Opshaug, Menlo Park, CA (US); James J. Spilker, Jr., Woodside, CA (US); Matthew Rabinowitz, Portola Valley, CA (US)

(73) Assignee: TruePosition, Inc., Berwyn, PA (US)

( * ) Notice: Subject to any disclaimer, the term of this patent is extended or adjusted under 35 U.S.C. 154(b) by 595 days.

(21) Appl. No.: 12/741,346

(22) PCT Filed: Jun. 2, 2009
(Under 37 CFR 1.47)

(86) PCT No.: PCT/US2009/046002
§ 371 (c)(1),
(2), (4) Date: May 11, 2011

(87) PCT Pub. No.: WO2009/149104
PCT Pub. Date: Dec. 10, 2009

(65) Prior Publication Data
US 2011/0263269 A1    Oct. 27, 2011

Related U.S. Application Data

(63) Continuation-in-part of application No. 10/867,577, filed on Jun. 14, 2004, now abandoned, which is a continuation of application No. 10/210,847, filed on Jul. 31, 2002, now Pat. No. 6,861,984, which is a continuation of application No. 09/887,158, filed on Jun. 21, 2001, now abandoned, application No. 12/741,346, which is a continuation-in-part of application No. 11/068,570, filed on Feb. 28, 2005, now abandoned, which is a continuation-in-part of application No. 09/932,010, filed on Aug. 17, 2001, now Pat. No. 7,126,536, which is a continuation-in-part of application No. 10/159,478, filed on May 31, 2002, now Pat. No. 7,463,195, application No. 12/741,346, which is a continuation-in-part of application No. 11/284,800, filed on Nov. 22, 2005, now Pat. No. 8,102,317, which is a continuation-in-part of application No. 10/054,302, filed on Jan. 22, 2002, now Pat. No. 6,559,800, application No. 12/741,346, which is a continuation-in-part of application No. 12/263,731, filed on Nov. 3, 2008, now Pat. No. 7,733,270, which is a continuation-in-part of application No. 12/117,676, filed on May 8, 2008, now Pat. No. 8,233,091, which is a continuation-in-part of application No. 12/209,971, filed on Sep. 12, 2008, now Pat. No. 8,106,828.

(60) Provisional application No. 60/265,675, filed on Feb. 2, 2001, provisional application No. 60/281,270, filed on Apr. 3, 2001, provisional application No. 60/293,812, filed on May 25, 2001, provisional application No. 60/293,813, filed on May 25, 2001, provisional application No. 60/293,646, filed on May 25, 2001, provisional application No. 61/058,281, filed on Jun. 3, 2008, provisional application No. 61/075,160, filed on Jun. 24, 2008, provisional application No. 61/105,063, filed on Oct. 14, 2008.

(51) Int. Cl.
*G01S 19/46* (2010.01)
*G01S 19/38* (2010.01)

(52) U.S. Cl.
USPC ................................ 342/357.29; 342/357.21

(58) Field of Classification Search
USPC .......... 342/357.21, 357.25, 357.29, 457, 463; 455/456.1, 456.5
See application file for complete search history.

(56) References Cited

U.S. PATENT DOCUMENTS

| | | | |
|---|---|---|---|
| 4,355,368 A | 10/1982 | Zeidler et al. |
| 4,555,707 A | 11/1985 | Connelly |
| 4,652,884 A | 3/1987 | Starker |
| 4,700,306 A | 10/1987 | Wallmander |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,271,034 A | 12/1993 | Abaunza |
| 5,323,322 A | 6/1994 | Mueller et al. |
| 5,398,034 A | 3/1995 | Spilker, Jr. |
| 5,432,542 A | 7/1995 | Thibadeau et al. |
| 5,481,316 A | 1/1996 | Patel |
| 5,504,492 A | 4/1996 | Class et al. |
| 5,510,801 A | 4/1996 | Engelbrecht et al. |
| 5,604,765 A | 2/1997 | Bruno et al. |
| 5,630,206 A | 5/1997 | Urban et al. |
| 5,648,982 A | 7/1997 | Durrant et al. |
| 5,774,829 A | 6/1998 | Cisneros et al. |
| 5,784,339 A | 7/1998 | Woodsum et al. |
| 5,835,060 A | 11/1998 | Czarnocki et al. |
| 5,920,284 A | 7/1999 | Victor |
| 5,938,034 A | 8/1999 | Josephsen et al. |
| 5,952,958 A | 9/1999 | Speasl et al. |
| 5,953,311 A | 9/1999 | Davies et al. |
| 6,006,097 A | 12/1999 | Hornfeldt et al. |
| 6,016,119 A | 1/2000 | Krasner |
| 6,078,284 A | 6/2000 | Levanon |
| 6,094,168 A | 7/2000 | Duffett-Smith et al. |
| 6,107,959 A | 8/2000 | Levanon |
| 6,115,113 A | 9/2000 | Flockencier |
| 6,131,067 A | 10/2000 | Girerd et al. |
| 6,137,441 A | 10/2000 | Dai et al. |
| 6,144,413 A | 11/2000 | Zatsman |
| 6,147,642 A | 11/2000 | Perry et al. |
| 6,181,921 B1 | 1/2001 | Konisi et al. |
| 6,184,921 B1 | 2/2001 | Limberg |
| 6,201,497 B1 | 3/2001 | Snyder et al. |
| 6,215,778 B1 | 4/2001 | Lomp et al. |
| 6,229,480 B1 | 5/2001 | Shintani |
| 6,289,280 B1 | 9/2001 | Fernandez-Corbaton et al. |
| 6,317,452 B1 | 11/2001 | Durrant et al. |
| 6,317,500 B1 | 11/2001 | Murphy |
| 6,373,432 B1 | 4/2002 | Rabinowitz et al. |
| 6,374,177 B1 | 4/2002 | Lee et al. |
| 6,400,753 B1 | 6/2002 | Kohli et al. |
| 6,433,740 B1 | 8/2002 | Gilhousen |
| 6,437,832 B1 | 8/2002 | Grabb et al. |
| 6,484,034 B1 | 11/2002 | Tsunehara et al. |
| 6,522,297 B1 | 2/2003 | Rabinowitz et al. |
| 6,559,800 B2 | 5/2003 | Rabinowitz et al. |
| 6,559,894 B2 | 5/2003 | Omura et al. |
| 6,590,529 B2 | 7/2003 | Schwoegler |
| 6,618,452 B1 | 9/2003 | Huber et al. |
| 6,646,603 B2 | 11/2003 | Dooley et al. |
| 6,717,547 B2 | 4/2004 | Spilker, Jr. et al. |
| 6,721,365 B1 | 4/2004 | Yin et al. |
| 6,727,847 B2 | 4/2004 | Rabinowitz et al. |
| 6,753,812 B2 | 6/2004 | Rabinowitz et al. |
| 6,754,281 B1 | 6/2004 | Dujardin et al. |
| 6,806,830 B2 | 10/2004 | Panasik et al. |
| 6,809,775 B2 | 10/2004 | Yule |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,937,866 B2 | 8/2005 | Duffett-Smith et al. |
| 6,952,182 B2 | 10/2005 | Spilker, Jr. et al. |
| 6,961,020 B2 | 11/2005 | Robinowitz et al. |
| 6,963,306 B2 | 11/2005 | Spilker, Jr. |
| 6,970,132 B2 | 11/2005 | Spilker, Jr. et al. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 7,260,378 B2 | 8/2007 | Holland et al. |
| 7,269,424 B2 | 9/2007 | Camp, Jr. |
| 7,307,666 B2 | 12/2007 | Wu et al. |
| 7,372,405 B2 | 5/2008 | Rabinowitz et al. |
| 7,463,195 B2 | 12/2008 | Rabinowitz et al. |
| 7,471,244 B2 | 12/2008 | Omura et al. |
| 2002/0008662 A1 | 1/2002 | Dooley et al. |
| 2002/0009135 A1 | 1/2002 | Omura et al. |
| 2002/0105976 A1 | 8/2002 | Kelly et al. |
| 2002/0122003 A1 | 9/2002 | Patwari et al. |
| 2002/0152462 A1 | 10/2002 | Hoch et al. |
| 2002/0168988 A1 | 11/2002 | Younis |
| 2002/0184653 A1 | 12/2002 | Pierce et al. |
| 2002/0199196 A1 | 12/2002 | Rabinowitz et al. |
| 2003/0122711 A1 | 7/2003 | Panasik et al. |
| 2003/0156063 A1 | 8/2003 | Spilker et al. |
| 2003/0162547 A1 | 8/2003 | McNair |
| 2004/0073914 A1 | 4/2004 | Spilker et al. |
| 2004/0201779 A1 | 10/2004 | Spilker et al. |
| 2005/0015162 A1 | 1/2005 | Omura et al. |
| 2005/0066373 A1 | 3/2005 | Rabinowitz |
| 2005/0251844 A1 | 11/2005 | Martone et al. |
| 2006/0018413 A1 | 1/2006 | Gupta |
| 2006/0050625 A1 | 3/2006 | Krasner |
| 2006/0067412 A1 | 3/2006 | Qiu et al. |
| 2006/0104257 A1 | 5/2006 | Laroia et al. |
| 2006/0114812 A1 | 6/2006 | Kim et al. |
| 2006/0274816 A1 | 12/2006 | Tanaka |
| 2007/0050824 A1 | 3/2007 | Lee et al. |
| 2007/0121555 A1 | 5/2007 | Burgess et al. |
| 2007/0131079 A1 | 6/2007 | Opshaug et al. |
| 2007/0139265 A1 | 6/2007 | Monnerat |
| 2007/0182633 A1 | 8/2007 | Omura et al. |
| 2007/0291676 A1 | 12/2007 | Berggren |
| 2007/0296632 A1 | 12/2007 | Opshaug et al. |
| 2009/0070847 A1 | 3/2009 | Furman et al. |
| 2009/0175379 A1 | 7/2009 | Rubin et al. |

FOREIGN PATENT DOCUMENTS

| | | |
|---|---|---|
| DE | 3242997 A1 | 5/1984 |
| EP | 58129277 | 8/1983 |
| GB | 2222922 A | 3/1990 |
| GB | 2254508 A | 10/1992 |
| JP | 2000-023055 A | 1/2000 |
| WO | WO 2009/149104 A3 | 12/2009 |

OTHER PUBLICATIONS

U.S. Appl. No. 10/008,613, filed Nov. 8, 2001, Pierce et al.
U.S. Appl. No. 10/867,577, filed Jun. 14, 2004, Rabinowitz et al.
U.S. Appl. No. 11/380,691, filed Apr. 28, 2006, Metzler et al.
U.S. Appl. No. 11/535,485, field Sep. 27, 2006, Furman et al.
U.S. Appl. No. 11/622,838, filed Jan. 12, 2207, Rabinowtiz et al.
U.S. Appl. No. 11/770,162, filed Jun. 28, 2007, Furman et al.
U.S. Appl. No. 11/865,881, filed Oct. 2, 2007, Opshaug et al.
U.S. Appl. No. 12/117,676, filed May 8, 2008, Rabinowitz et al.
U.S. Appl. No. 12/168,141, filed Jul. 6, 2008, Furman et al.
U.S. Appl. No. 12/209,971, filed Sep. 12, 2008, Do et al.
U.S. Appl. No. 12/263,731, filed Nov. 3, 2008, Rabinowitz et al.
U.S. Appl. No. 12/333,445, filed Dec. 12, 2008, Rubin et al.
U.S. Appl. No. 12/351,841, filed Jan. 11, 2009, Lee et al.
U.S. Appl. No. 12/476,992, filed Jun. 2, 2009, Do et al.
U.S. Appl. No. 61/105,063, filed Oct. 14, 2008, Opshaug et al.
Duffett-Smith et al., "Precise Time Transfer in a Mobile Radio Terminal", ION NTM, Jan. 24-26, 2005, 1101-1106.
International Patent Application No. PCT/US2009/046002: International Search Report Dated Jan. 22, 2010, 2 pages.
Li et al., "Indoor Geolocation Using OFDM Signals in HIPERLAN/2 Wireless LANS", 11th IEEE International Symposium on Personal Indoor and Mobile Radio Communications, PIMRC 2000, Proceedings (Cat. No. 00[th]8525), Proceedings of 11th International Symposium on Personal Indoor and Mobile Radio Communication, London, UK, Sep. 18-21, 2000, 2, 1449-1453, XP010520871, 2000, Pisctaway, NJ, IEEE, USA, ISBN; 9-7803-6463-5, Chapter I and III.

(56) References Cited

OTHER PUBLICATIONS

Parkinson et al., "Autonomous GPS Integrity Monitoring Using the Pseudorange Residual", Journal of the Institute of Navigation, 1988, 35(2), 255-274.

Rabinowitz et al., "Positioning Using the ATSC Digital Television Signal", Rosum Whitepaper Online!, 2001, www.rosum.com/whitepaper_8-7-01.pdf, accessed Mar. 13, 2003.

Rabinowitz, "A Differential Carrier Phase Navigation System Combining GPS with Low Earth Orbit Satellites for Rapid Resolution of Integer Cycle Ambiguities", PhD Thesis for Department of Electrical Engineering, Stanford University, Dec. 2000, 59-73.

Spilker, Jr., "Fundamentals of Signal Tracking Theory", Global Positioning System: Theory and Applications, 1994, Chapter 7, 1, 245-327.

VanDierendock, "GPS Receivers", Global Positioning System: Theory and Applications, 1995, Chapter 8, 1, 329-407.

*Primary Examiner* — Dao Phan

(74) *Attorney, Agent, or Firm* — Baker & Hostetler LLP

(57) ABSTRACT

Apparatus having corresponding methods and tangible computer-readable media comprise: a measurement module adapted to generate measurements of a wireless television signal received by the apparatus and measurements of a wireless satellite positioning signal received by the apparatus; a location module adapted to determine a location of the apparatus based on the measurements of the wireless television signal and the measurements of the wireless satellite positioning signal; and a time module adapted to provide a clock control signal for the apparatus based on at least one of the measurements of the wireless television signal, and the measurements of the wireless satellite positioning signal.

11 Claims, 9 Drawing Sheets

TIME, FREQUENCY, AND LOCATION DETERMINATION FOR FEMTOCELLS

CROSS-REFERENCE TO RELATED APPLICATIONS

This application is a CIP of Ser. No. 10/867,577 Jun. 14, 2004
which is a CIP of Ser. No. 10/210,847 Jul. 31, 2002 now U.S. Pat. No. 6,861,984
which is a CIP of Ser. No. 09/887,158 Jun. 21, 2001 ABN
which claims the benefit of 60/265,675 Feb. 2, 2001
which claims the benefit of 60/281,270 Apr. 3, 2001
which claims the benefit of 60/281,269 Apr. 3, 2001
which claims the benefit of 60/293,812 May 25, 2001
which claims the benefit of 60/293,813 May 25, 2001
which claims the benefit of 60/293,646 May 25, 2001.
This application is a CIP of Ser. No. 11/068,570 Feb. 28, 2005
which is a CIP of Ser. No. 09/932,010 Aug. 17, 2001 now U.S. Pat. No. 7,126,536
and which is a CIP of Ser. No. 10/159,478 May 31, 2002 now U.S. Pat. No. 7,463,195.
This application is a CIP of Ser. No. 11/284,800 Nov. 22, 2005
which is a CIP of Ser. No. 10/054,302 Jan. 22, 2002 now U.S. Pat. No. 6,559,800.
This application is a CIP of Ser. No. 12/263,731 Nov. 3, 2008.
This application is a CIP of Ser. No. 12/117,676 May 8, 2008.
This application is a CIP of Ser. No. 12/209,971 Sep. 12, 2008.
This application claims the benefit of 61/058,281 Jun. 3, 2008.
This application claims the benefit of 61/075,160 Jun. 24, 2008.
This application claims the benefit of 61/105,063 Oct. 14, 2008.
The disclosures of all of the above are incorporated by reference herein in their entirety.

BACKGROUND

The present disclosure relates generally to the determination of frequency, location and time. More particularly, the present disclosure relates to determining frequency, location and time based on television signals, satellite positioning signals, signals of opportunity, and the like. This knowledge of frequency, location and time has many applications. For example, knowledge of frequency, location and time can be used to fulfill the requirements of consumer wireless mobile telephone base stations referred to as "femtocells."

Wireless mobile telephones are gaining in popularity. However, many consumers have retained their conventional wired telephones, in part due to their superior reliability compared to wireless mobile telephones. In particular, wireless mobile telephone signals are often attenuated or blocked inside buildings, leading to dropped calls, reduced data rates, and the like.

To address these reliability problems, consumer wireless mobile telephone base stations, referred to as "femtocells," are being introduced to the marketplace. FIG. 1 shows a prior art wireless mobile telephone system 100 that includes a femtocell 102. Referring to FIG. 1, wireless mobile telephone system 100 also includes a "macrocell" 104, which includes a conventional wireless mobile telephone antenna 106 and a conventional wireless mobile telephone base station 108, which is in turn connected to the public switched telephone network (PSTN) 110.

Femtocell 102 also includes a conventional wireless mobile telephone antenna 128. Femtocell 102 is generally connected to PSTN 110 by a broadband connection to the Internet 114. A wireless mobile telephone 116 can communicate with other telephones connected to PSTN 110 by exchanging wireless mobile telephone signals 118 with macrocell 104 and femtocell 102.

A key requirement for any sort of base station, whether it be a macrocell 104 or a femtocell 102, is precise knowledge of frequency and time. This knowledge is required to synchronize the bases stations, which otherwise would interfere with each other. In addition, precise knowledge of time is required for operations such as handovers from one base station to another. The precise determination of time in turn involves precise knowledge of location.

The information required for this precise determination of time and location is generally acquired from satellite positioning systems such as the Global Positioning System (GPS). Referring again to FIG. 1, GPS satellites 120 provide GPS signals 122 that can be used to obtain precise knowledge of time and location. Base stations generally include GPS antennas to obtain GPS signals 122. In system 100, macrocell 104 includes a GPS antenna 124, and femtocell 102 includes a GPS antenna 126.

Conventional femtocells rely upon GPS signals to obtain precise knowledge of time and location. However, GPS signals are often attenuated or blocked indoors, where femtocells are usually deployed. The required GPS signals can only be obtained by locating the femtocell near a window with a suitable view of the GPS satellites, connecting an expensive GPS antenna to the femtocell, and the like.

SUMMARY

In general, in one aspect, an embodiment features an apparatus comprising: a measurement module adapted to generate measurements of a wireless television signal received by the apparatus and measurements of a wireless satellite positioning signal received by the apparatus; a location module adapted to determine a location of the apparatus based on the measurements of the wireless television signal and the measurements of the wireless satellite positioning signal; and a time module adapted to provide a clock control signal for the apparatus based on at least one of the measurements of the wireless television signal, and the measurements of the wireless satellite positioning signal.

Embodiments of the apparatus can include one or more of the following features. Some embodiments comprise an oscillator adapted to provide one or more clock signals based on the clock control signal. Some embodiments comprise a receiver adapted to receive the wireless television signal and the wireless satellite positioning signal. Some embodiments comprise a transceiver adapted to transceive wireless mobile telephone signals based at least one of the clock signals. Some embodiments comprise a time base module adapted to provide a periodic time base signal based on one or more of the clock signals; wherein the transceiver is further adapted to transceive the wireless mobile telephone signals based on the periodic time base signal. Some embodiments comprise a network interface adapted to transceive network signals representing the wireless mobile telephone signals.

In general, in one aspect, an embodiment features a method comprising: generating measurements of a wireless television signal received by an apparatus and measurements of a wireless satellite positioning signal received by the apparatus; determining a location of the apparatus based on the measurements of the wireless television signal and the measurements of the wireless satellite positioning signal; and providing a clock control signal for the apparatus based on at least one of the measurements of the wireless television signal, and the measurements of the wireless satellite positioning signal.

Embodiments of the method can include one or more of the following features. Some embodiments comprise providing one or more clock signals based on the clock control signal. Some embodiments comprise receiving the wireless television signal and the wireless satellite positioning signal. Some embodiments comprise transceiving wireless mobile telephone signals based at least one of the clock signals. Some embodiments comprise providing a periodic time base signal based on one or more of the clock signals; and transceiving the wireless mobile telephone signals based on the periodic time base signal. Some embodiments comprise transceiving network signals representing the wireless mobile telephone signals.

In general, in one aspect, an embodiment features tangible computer-readable media embodying instructions executable by a computer to perform a method comprising: generating measurements of a wireless television signal received by an apparatus and measurements of a wireless satellite positioning signal received by the apparatus; determining a location of the apparatus based on the measurements of the wireless television signal and the measurements of the wireless satellite positioning signal; and causing the apparatus to provide a clock control signal for the apparatus based on at least one of the measurements of the wireless television signal, and the measurements of the wireless satellite positioning signal.

Embodiments of the tangible computer-readable media can include one or more of the following features. In some embodiments, the method further comprises: causing the apparatus to provide one or more clock signals based on the clock control signal. In some embodiments, the method further comprises: causing the apparatus to transceive wireless mobile telephone signals based at least one of the clock signals. In some embodiments, the method further comprises: causing the apparatus to provide a periodic time base signal based on one or more of the clock signals; and causing the apparatus to transceive the wireless mobile telephone signals based on the periodic time base signal. In some embodiments, the method further comprises: causing the apparatus to transceive network signals representing the wireless mobile telephone signals.

The details of one or more implementations are set forth in the accompanying drawings and the description below. Other features will be apparent from the description and drawings, and from the claims.

Figure 1:
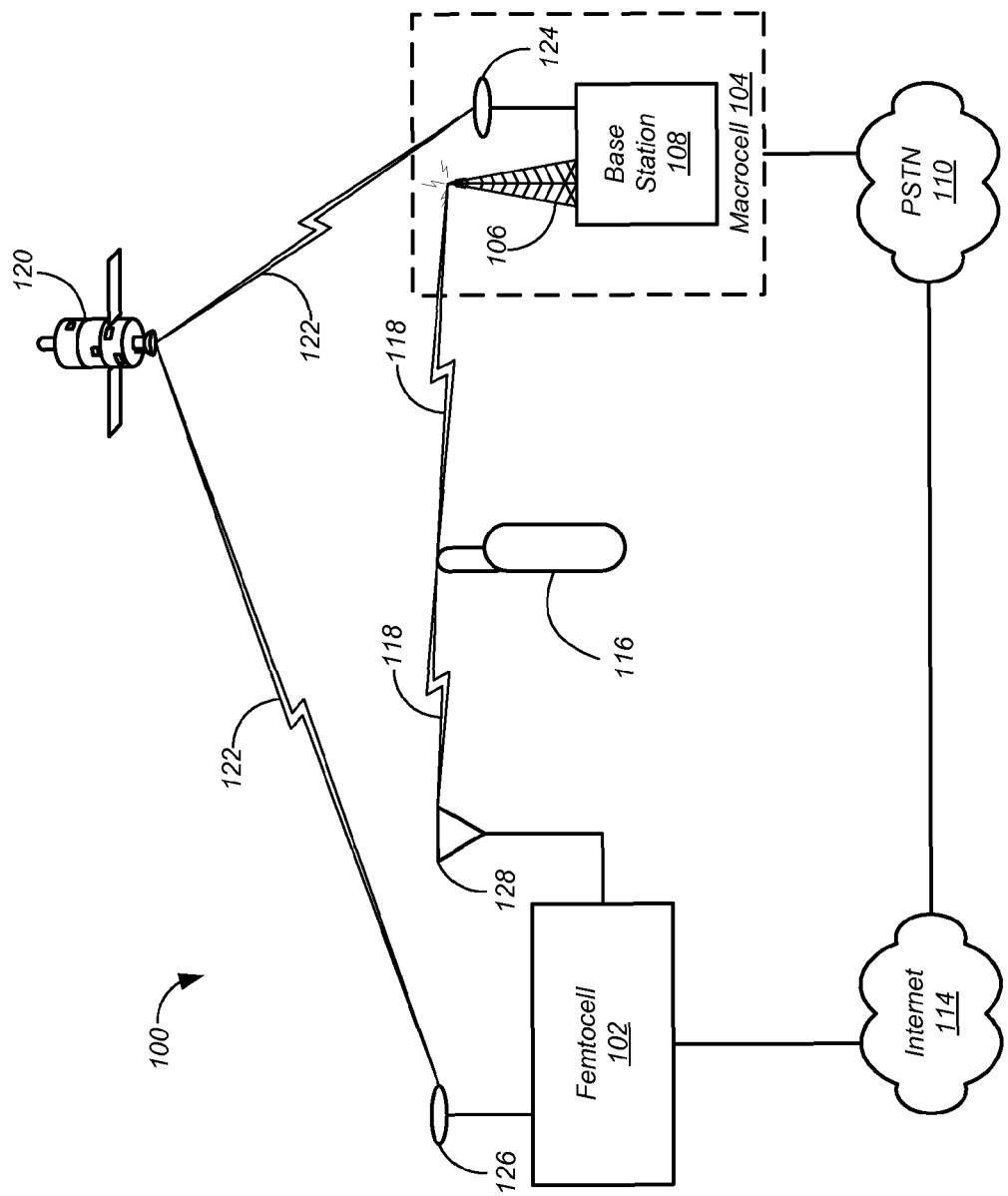
FIG. 1 shows a prior art wireless mobile telephone system that includes a femtocell.

The leading digit(s) of each reference numeral used in this specification indicates the number of the drawing in which the reference numeral first appears.

DETAILED DESCRIPTION

Embodiments of the present disclosure provide precise determination of location and time based on television signals, satellite positioning signals, signals of opportunity, and the like, for use in consumer wireless mobile telephone base stations referred to as "femtocells."

Embodiments of the present disclosure are described in terms of the use of DTV and GPS signals. However, if GPS signals are not available, DTV signals can be used alone or in combination with other signals, herein referred to collectively as signals of opportunity. The DTV signals can include, for example, Advanced Television Systems Committee DTV (ATSC) signals, Digital Video Broadcasting (DVB) DTV signals, Integrated Services Digital Broadcasting (ISDB) DTV signals, and the like. The signals of opportunity can include, for example, mobile telephone signals, analog TV signals, Digital Audio Broadcast (DAB) signals, VHF Omni-directional Radio (VOR) signals, FM radio signals, and the like.

Figure 2:
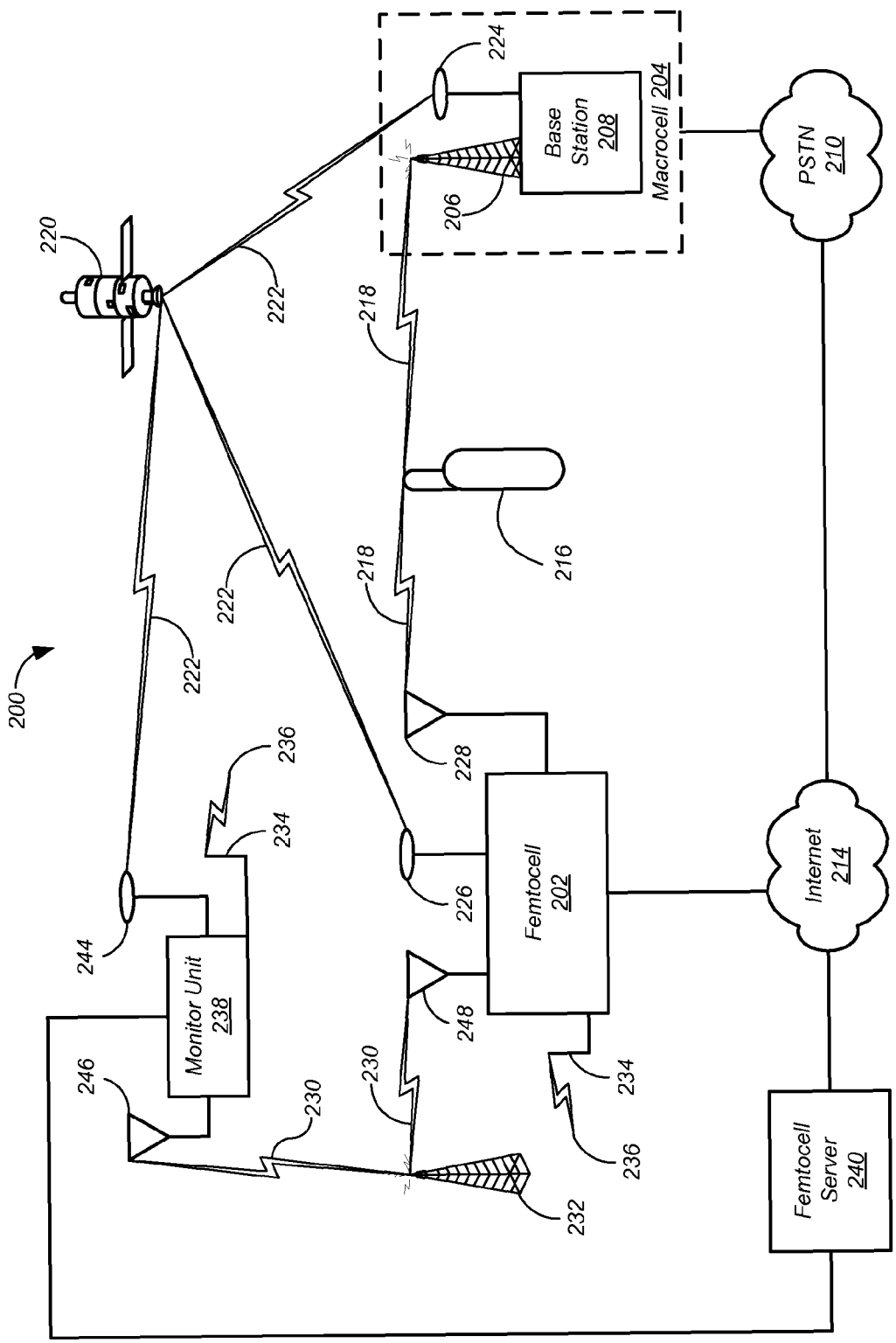
FIG. 2 shows elements of a wireless mobile telephone system that includes a femtocell according to embodiments of the present disclosure.

FIG. 2 shows elements of a wireless mobile telephone system 200 that includes a femtocell 202 according to embodiments of the present disclosure. Although in the described embodiments, the elements of wireless mobile telephone system 200 are presented in one arrangement, other embodiments may feature other arrangements, as will be apparent to one skilled in the relevant arts based on the disclosure and teachings provided herein. For example, the elements of wireless mobile telephone system 200 can be implemented in hardware, software, or combinations thereof.

Referring to FIG. 2, wireless mobile telephone system 200 also includes a "macrocell" 204, which includes a conventional wireless mobile telephone antenna 206 and a conventional wireless mobile telephone base station 208, which is in turn connected to the public switched telephone network (PSTN) 210.

Femtocell 202 also includes a conventional wireless mobile telephone antenna 228. Femtocell 202 is generally connected to PSTN 210 by a broadband connection to the Internet 214, although other sorts of connections can be used instead. A wireless mobile telephone 216 can communicate with other telephones connected to PSTN 210 by exchanging wireless mobile telephone signals 218 with macrocell 204 and femtocell 202.

In order to obtain wireless GPS signals 222, macrocell 204 includes a GPS antenna 224, and femtocell 202 includes a GPS antenna 226. Femtocell 202 also includes a digital television (DTV) antenna 248 in order to obtain wireless DTV signals 230 transmitted by DTV transmitters 232. Femtocell 202 can also include additional antennas 234 in order to obtain other signals such as signals of opportunity 236 and the like.

Wireless mobile telephone system 200 also includes one or more monitor units 238 and one or more femtocell servers 240. Each monitor unit 238 includes a GPS antenna 244 to obtain wireless GPS signals 222 and a DTV antenna 246 to obtain wireless DTV signals 230. Each monitor unit 238 can also include additional antennas 234 to obtain other signals such as signals of opportunity 236 and the like. Femtocell 202, monitor units 238, and femtocell servers 240 can communicate using Internet 214, by other techniques, by combinations thereof, and the like.

Figure 3:
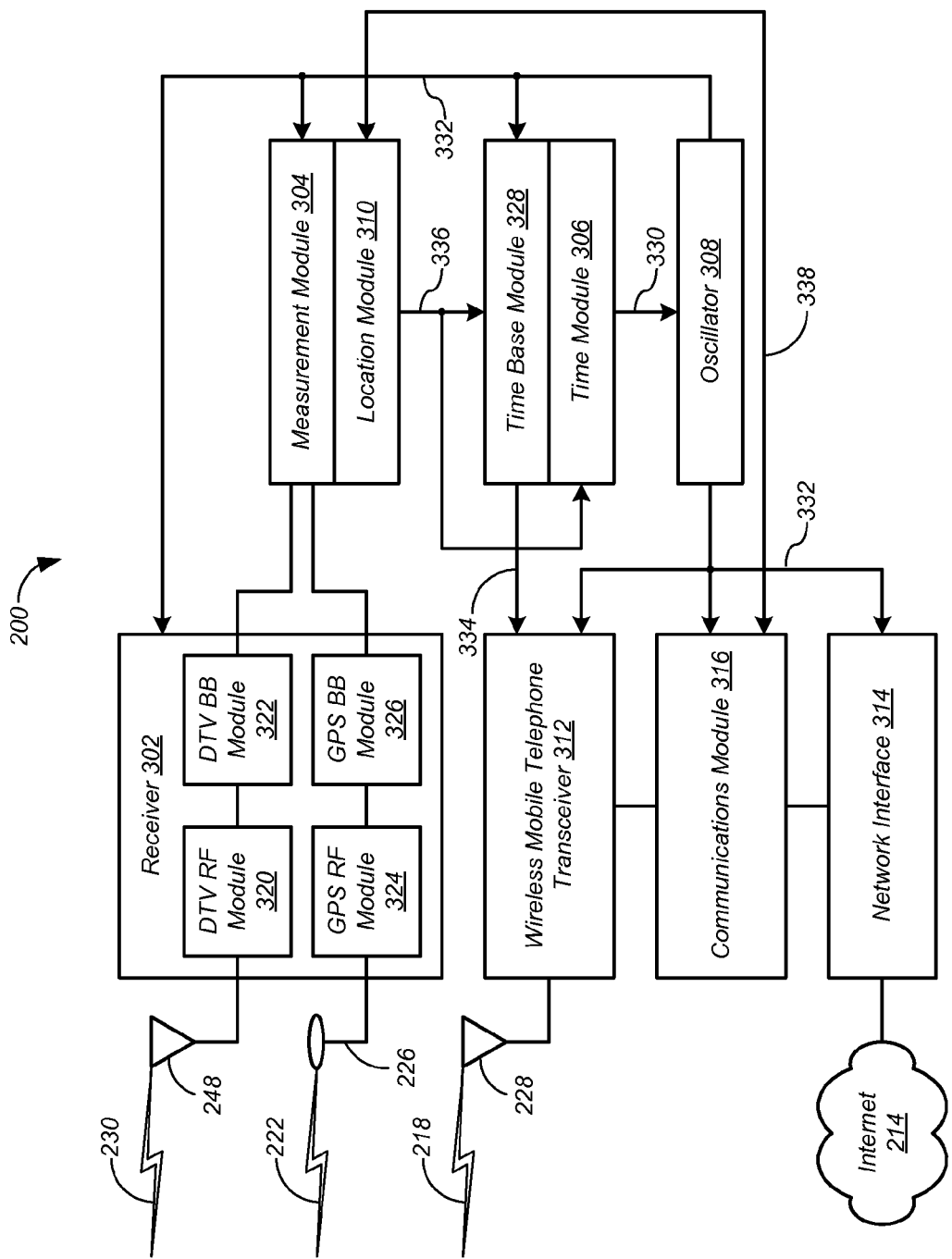
FIG. 3 shows elements of the femtocell of FIG. 2 according to embodiments of the present disclosure.

FIG. 3 shows elements of femtocell 202 of FIG. 2 according to embodiments of the present disclosure. Although in the described embodiments, the elements of femtocell 202 are presented in one arrangement, other embodiments may feature other arrangements, as will be apparent to one skilled in the relevant arts based on the disclosure and teachings provided herein. For example, the elements of femtocell 202 can be implemented in hardware, software, or combinations thereof.

Referring to FIG. 3, femtocell 202 includes a receiver 302, a measurement module 304, a time module 306, an oscillator 308, a location module 310. Receiver 302 includes a DTV radio-frequency (RF) module 320, a DTV baseband (BB) module 322, a GPS RF module 324, and a GPS baseband module 326. Femtocell 202 can also include a time base module 328. Femtocell 202 also includes a wireless mobile telephone transceiver 312, a network interface 314 in communication with Internet 214, and a communications module 316 to provide communications between wireless mobile telephone transceiver 312 and network interface 314. Femtocell 202 also includes wireless mobile telephone antenna 228, GPS antenna 226, and DTV antenna 248.

Receiver 302, wireless mobile telephone transceiver 312, and network interface 314 can be implemented according to conventional techniques. Measurement module 304, time module 306, and time base module 328 can be implemented as a digital signal processor. The digital signal processor can be implemented as a field-programmable gate array (FPGA), which can also include DTV baseband module 322 and GPS baseband module 326. Location module 310 and communications module 316 can be implemented as software executing on a processor. Oscillator 308 can be implemented as a voltage-controlled temperature-compensated crystal oscillator (VCTCXO).

Figure 4:
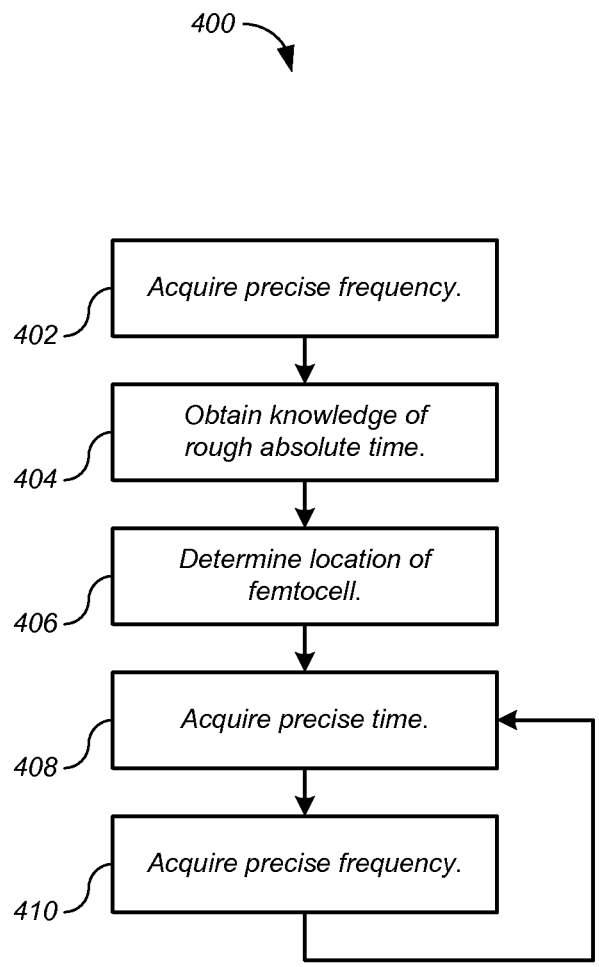
FIG. 4 shows a process for wireless mobile telephone system of FIGS. 2 and 3 according to embodiments of the present disclosure.

FIG. 4 shows a process 400 for wireless mobile telephone system 200 of FIGS. 2 and 3 according to embodiments of the present disclosure. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Referring to FIG. 4, femtocell 202 acquires precise frequency (step 402). In particular, time module 306 of femtocell 202 provides a clock control signal 330 for oscillator 308 of femtocell 202 based on one or more wireless DTV signals 230 received by femtocell 202.

Figure 5:
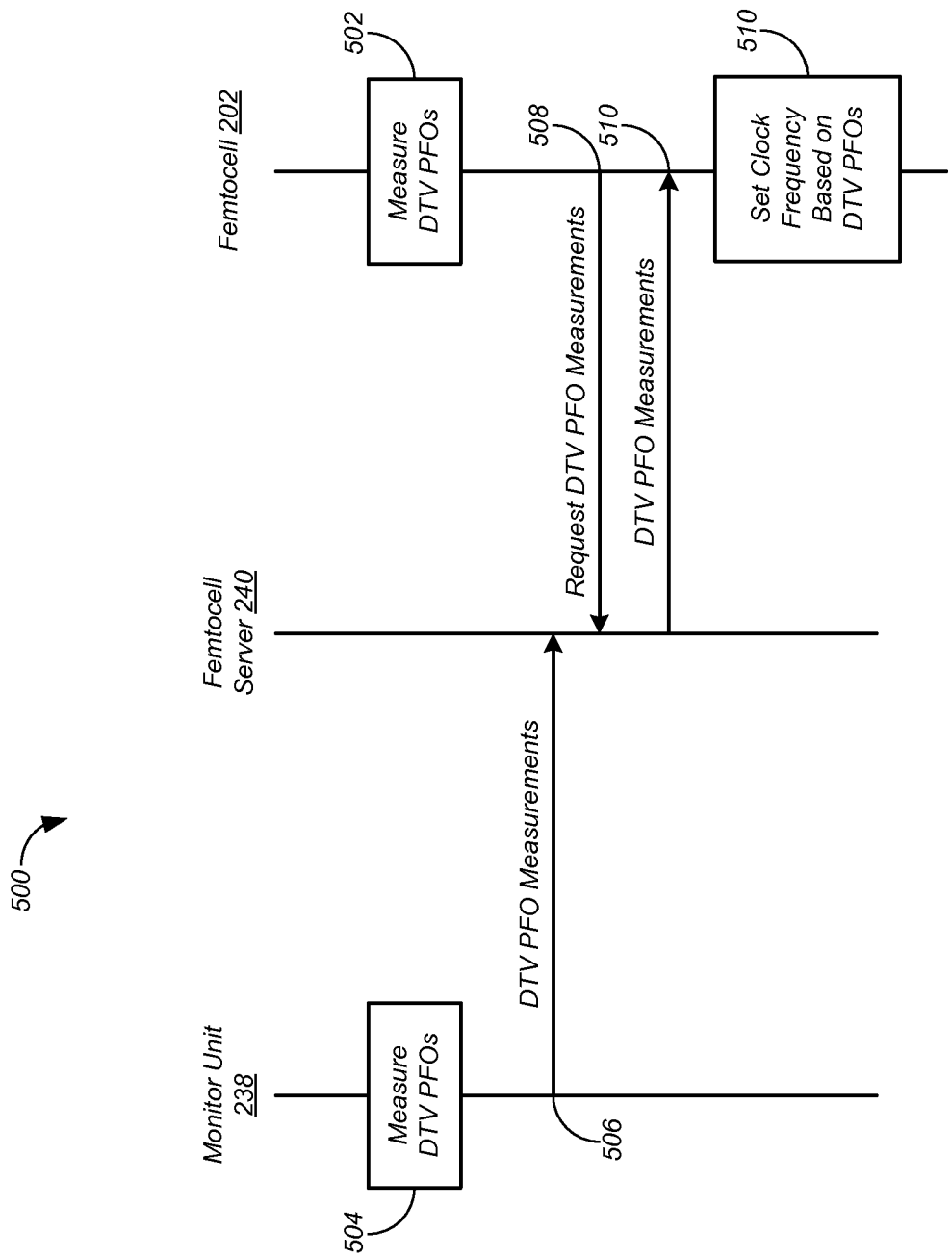
FIG. 5 shows a process for setting the frequency of the femtocell oscillator of FIG. 3 according to embodiments of the present disclosure.

FIG. 5 shows a process 500 for controlling the frequency of femtocell oscillator 308 of FIG. 3 according to embodiments of the present disclosure. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, measurement module 304 of femtocell 202 measures the pilot frequency offset (PFO) of one or more DTV channels (step 502). Monitor unit 238 measures the PFO of the same DTV channels (step 504). Femtocell server 240 acquires the measurements made by monitor unit 238 (step 506). Femtocell 202 requests the measurements made by monitor unit 238 from femtocell server 240 (step 508). Femtocell 202 responds by sending the measurements to femtocell 202 (step 510).

Femtocell 202 sets the frequency of oscillator 308 according to the PFO measurements (step 510). In particular, for each of the DTV channels, time module 306 of femtocell 202 determines the difference between the PFO measured by femtocell 202 and the PFO measured by monitor unit 238. The PFO differences are used to generate clock control signal 330, which sets the frequency of oscillator 308. In some embodiments, clock control signal 330 is implemented as a pulse-width modulated signal. Based on clock control signal 330, oscillator 308 provides one or more clock signals 332.

In some embodiments, femtocell 202 includes a time base module 328 that provides a time base signal 334 based on one or more of clock signals 332. For example, time base signal 334 can take the form of a pulse-per-second waveform that accurately provides one pulse each second. Time base signal 334 is useful for wireless telephone technologies such as time division multiple access (TDMA) and the like. The phase of time base signal 334 is set according to absolute time, which can be acquired by femtocell 202 as described below.

Figure 6:
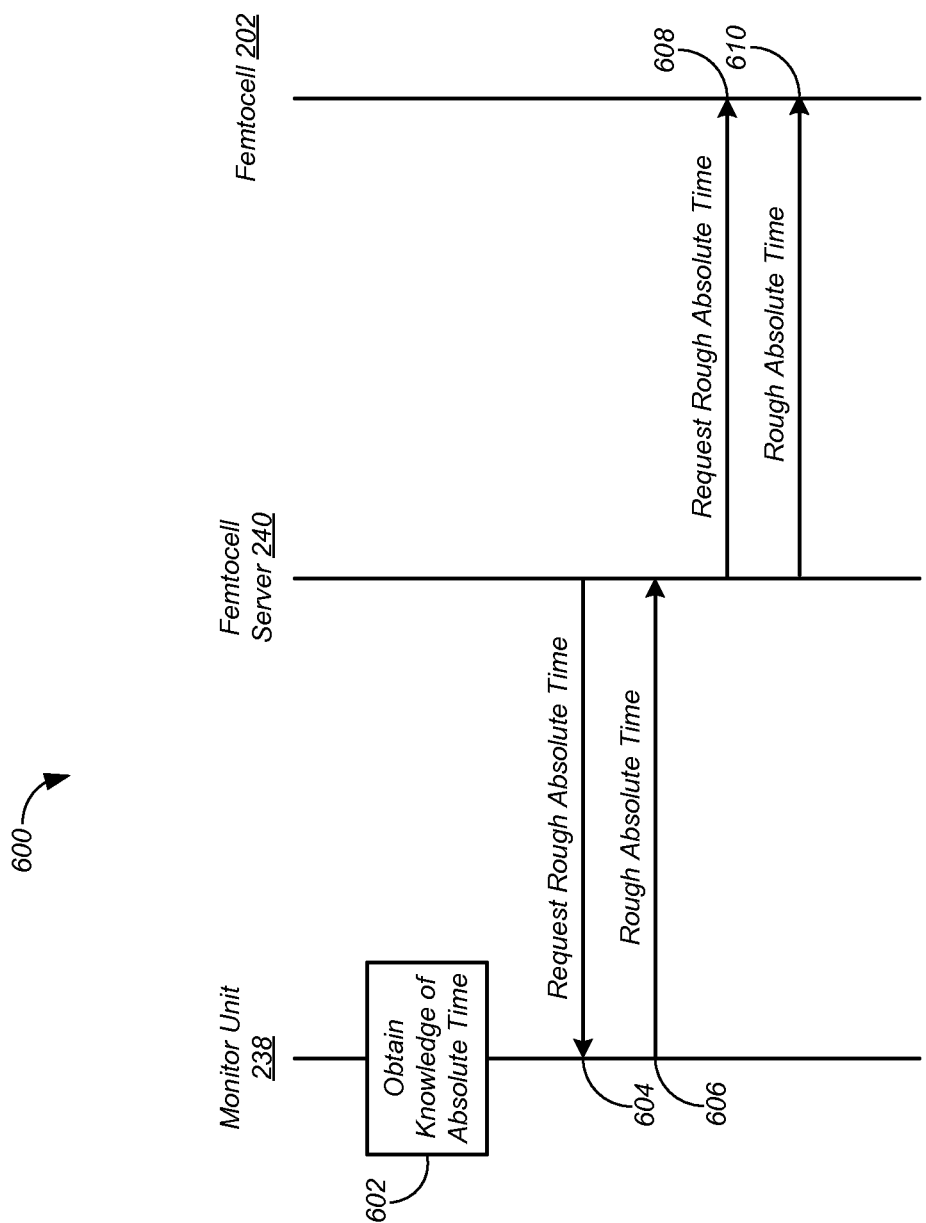
FIG. 6 shows a process for the femtocell of FIGS. 2 and 3 to obtain knowledge of absolute time according to embodiments of the present disclosure.

Referring again to FIG. 4, after acquiring precise frequency, femtocell 202 obtains knowledge of rough absolute time (step 404). FIG. 6 shows a process 600 for femtocell 202 of FIGS. 2 and 3 to obtain knowledge of rough absolute time according to embodiments of the present disclosure. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIG. 6, each monitor unit 238 obtains knowledge of absolute time (step 602). For example, monitor units 238 can be locked to GPS time using GPS signals 222. Each femtocell server 240 obtains knowledge of rough absolute time from one or more monitor units 238. For example, femtocell server 240 requests rough absolute time by sending a message to a monitor unit 238 (step 604), and monitor unit 238 responds with a message indicating rough absolute time (step 606). Femtocell server 240 then determines rough absolute time according to the messages. The determination can account for the time of transit of the messages. For example, the messages can be implemented according to Network Time Protocol (NTP) or the like.

Femtocell 202 acquires knowledge of rough absolute time from femtocell server 240. For example, femtocell 202 requests rough absolute time by sending a message to a femtocell server 240 (step 608), and femtocell server 240 responds with a message indicating rough absolute time (step 610). For example, femtocell 202 can acquire knowledge of rough absolute time from femtocell server 240 in the manner described above for femtocell server 240. In some embodiments, femtocell 202 acquires knowledge of rough absolute time only during initialization. In other embodiments, femtocell 202 acquires knowledge of rough absolute time at other times.

Referring again to FIG. 4, after acquiring knowledge of rough absolute time, femtocell 202 then determines the location of femtocell 202 (step 406). In some embodiments, femtocell 202 determines its location only during initialization. In other embodiments, femtocell 202 determines its location at other times as well.

Figure 7:
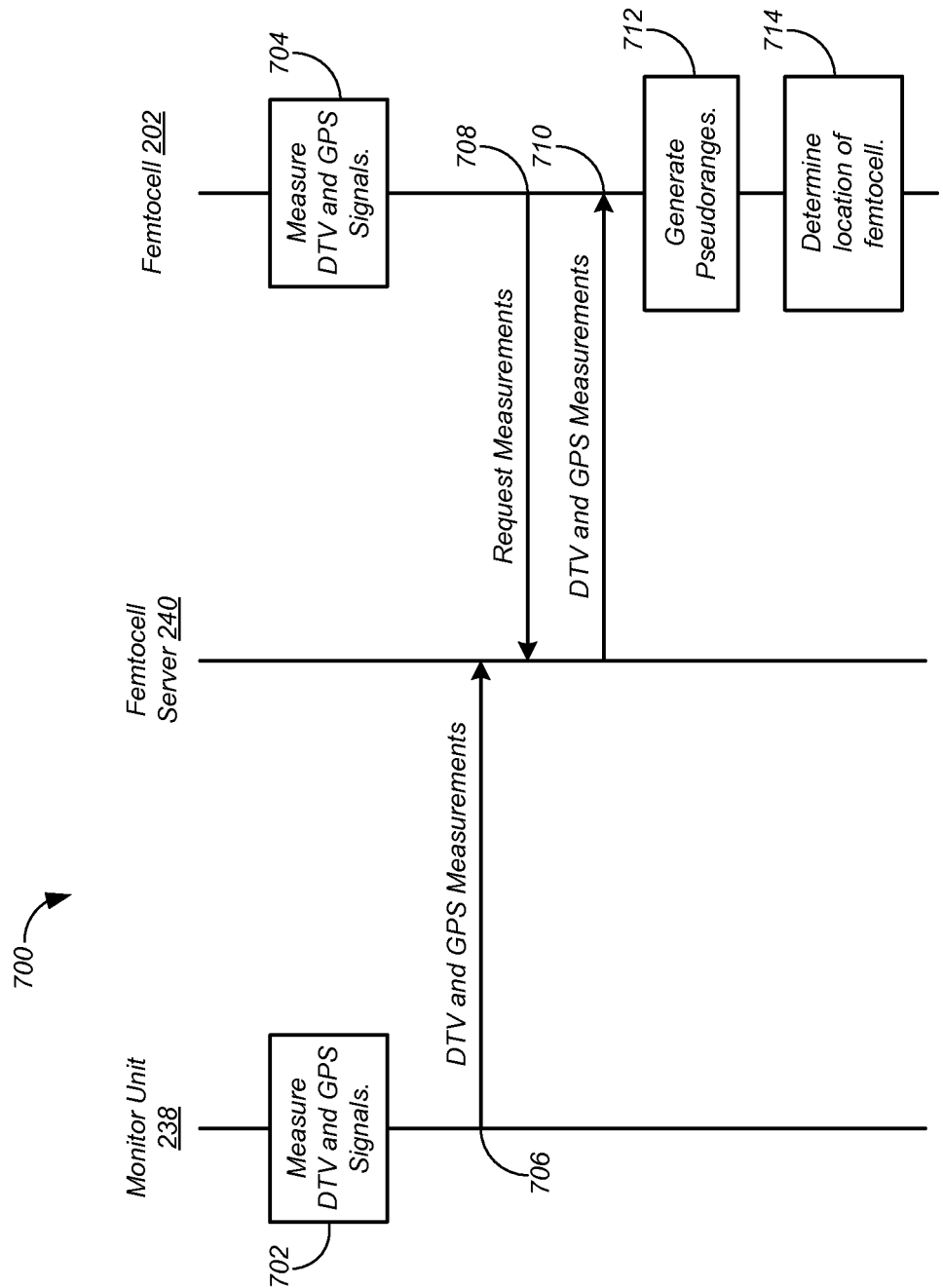
FIG. 7 shows a process for the femtocell of FIGS. 2 and 3 to determine its location according to embodiments of the present disclosure.

FIG. 7 shows a process 700 for femtocell 202 of FIGS. 2 and 3 to determine its location according to embodiments of the present disclosure. Although in the described embodiments, the elements of process 700 are presented in one arrangement, other embodiments may feature other arrangements, as will be apparent to one skilled in the relevant arts based on the disclosure and teachings provided herein. For example, in various embodiments, some or all of the steps of process 700 can be executed in a different order, concurrently, and the like.

Embodiments of the present disclosure employ DTV signals 230 to determine the location of femtocell 202 with a high degree of precision by generating pseudoranges based on known digital sequences repeated within the DTV signals 230. In some cases, this requires resolution of ambiguities associated with these signals. For example, ambiguities of 24.2 ms are associated with measurements of the PN511 sequence present in the ATSC DTV signal. Fine timing knowledge can be used to resolve these ambiguities. Femtocell 202 can obtain this fine timing knowledge by one or more techniques. Two such techniques are described below. Other techniques can be used, either alone or in combination.

In some embodiments, when both ATSC and NTSC TV signals are present, femtocell 202 can employ the beat frequency of the two TV signals to obtain fine timing knowledge. Further details of this technique are provided in U.S. patent application Ser. No. 12/117,676 filed May 8, 2008 and entitled "Reliable Positioning and Time Transfer Using Television Synchronization Signals," the disclosure thereof incorporated by reference herein in its entirety.

Figure 8:
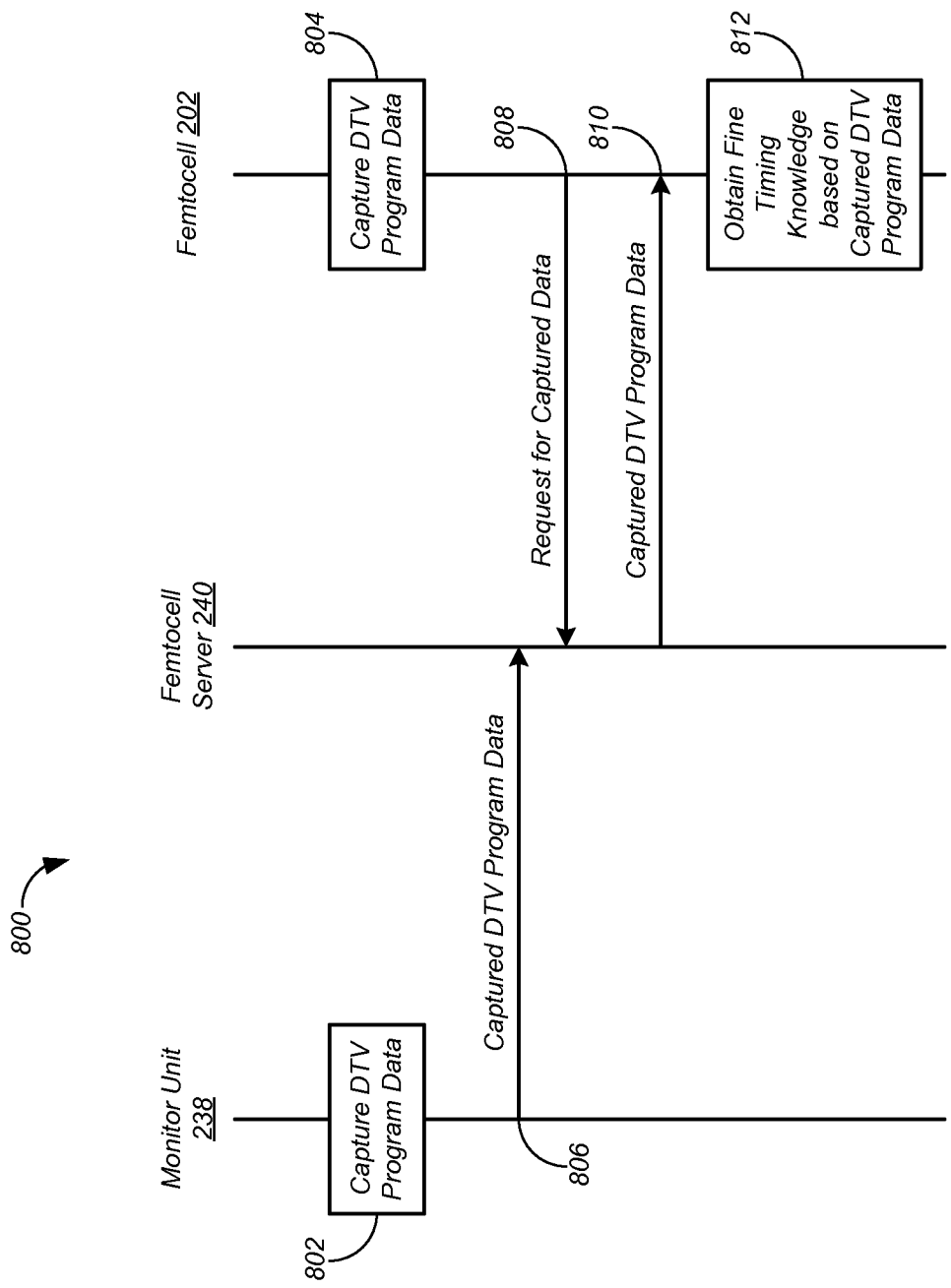
FIG. 8 shows a frame matching process for the femtocell of FIGS. 2 and 3 according to embodiments of the present disclosure.

In some embodiments, femtocell 202 employs a technique referred to herein as "frame matching," which does not require the use of NTSC TV signals. FIG. 8 shows a frame matching process 800 for femtocell 202 of FIGS. 2 and 3 according to embodiments of the present disclosure. Although in the described embodiments, the elements of process 800 are presented in one arrangement, other embodiments may feature other arrangements, as will be apparent to one skilled in the relevant arts based on the disclosure and teachings provided herein. For example, in various embodiments, some or all of the steps of process 800 can be executed in a different order, concurrently, and the like.

According to frame matching, referring to FIG. 8, DTV program data is captured by both monitor unit 238 (step 802) and femtocell 202 (step 804). Femtocell 202 acquires the DTV program data captured by monitor unit 238. For example, monitor unit 238 pushes the captured data to femtocell server 240 (step 806), and, in reply to a request for the data (step 808), femtocell server 240 sends the data to femtocell 202 (step 810). Femtocell 202 then obtains fine timing knowledge by matching the program data captured by femtocell 202 to the program data captured by monitor unit 238 (step 812). Further details of this technique are provided in U.S. patent application Ser. No. 12/209,971 filed Sep. 12, 2008 and entitled "Location Identification Service Based on Broadcast Digital and Analog Television Signals" and U.S. Provisional Patent Application Ser. No. 61/105,063 filed Oct. 14, 2008 and entitled "Hybrid Absolute Time Transfer Methods," the disclosures thereof incorporated by reference herein in their entirety.

Referring now to FIG. 7, DTV signals 230 and GPS signals 222 are measured both by monitor unit 238 (step 702) and by measurement module 304 of femtocell 202 (step 704). For monitor unit 238, the measurements of DTV signals 230 can include, for each of the DTV channels observed, the pilot frequency offset (PFO), the fractional symbol rate offset (FSRO), which is also sometimes referred to as the fractional code rate offset (FCRO), and a time of transmission (TOT) of a component of the respective DTV signal from DTV transmitter 232. For example, the component of an ATSC DTV signal can be the embedded PN511 sequence, and the FSRO can be measured by determining the rate of repetition of the PN511 sequence.

For femtocell 202, the measurements of DTV signals 230 can include, for each of the DTV channels observed, the pilot frequency offset (PFO) and a time of reception (TOR) of a component of the respective DTV signal at femtocell 202. The measurements of GPS signals 222 can include ionospheric delay model parameters, and satellite ephemeris for each GPS satellite 220 in view.

All of these measurements can be collected by a single monitor unit 238. If the monitor units 238 have a common time base, some of the measurements can be captured by each of a plurality of monitor units 238. For example, monitor units 238 can be locked to GPS time. Further details of monitor units 238 are provided in U.S. Pat. No. 7,471,244 issued Dec. 30, 2008 and entitled "Monitor Units for Television Signals," the disclosure thereof incorporated by reference herein in its entirety. Femtocell 202 can decode the ionospheric delay model parameters and satellite ephemeris for GPS satellites 220 when the GPS signals are received with sufficient power. Alternatively, the ionospheric delay model parameters and the ephemerides received by monitor unit 238 can be sent to femtocell 202.

Femtocell 202 acquires the measurements of DTV signals 230 and GPS signals 222 from one or more monitor units 238. For example, each monitor unit 238 time-tags its measurements, and pushes the time-tagged measurements to femtocell server 240 (step 706). Subsequently, femtocell 202 requests one or more of the time-tagged measurements from femtocell server 240 (step 708). In response to the request, femtocell server 240 identifies the most recent time-tagged measurements based on the time tags and the local clock of femtocell server 240, and sends the time-tagged measurements to femtocell 202 (step 710).

After acquiring the measurements of DTV signals 230 and GPS signals 222 from one or more monitor units 238, location module 310 of femtocell 202 determines the location of femtocell 202 based on the measurements of DTV signals 230 and GPS signals 222. In particular, location module 310 generates a pseudorange based on each of the signals 230, 222 (step 712). For each GPS signal 222 used, a pseudorange can be obtained according to conventional techniques.

For each DTV signal 230 used, the location determination involves the fractional symbol rate offset (FSRO) and time of transmission (TOT) measured by monitor unit 238, and the time of reception (TOR) measured by femtocell 202. The TOR of each DTV signal 230 can be determined using correlation techniques, for example by correlating the PN511 sequence of a captured ATSC DTV signal with a stored PN511 sequence. The correlation peak indicates the TOR of the DTV signal 230. Each DTV pseudorange is then generated by taking the difference between the TOR and TOT for one of the DTV signals. Further details of this technique are provided in U.S. patent application Ser. No. 10/867,577 filed Jun. 14, 2004 and entitled "Position Location using Broadcast Digital Television Signals," the disclosure thereof incorporated by reference herein in its entirety. Other techniques can be used as well.

After generating the pseudoranges, femtocell 202 determines its location based on the pseudoranges and the locations of the respective DTV transmitters and GPS satellites 220 (step 714). The location determination can also employ aiding information and the like provided over Internet 214 via network interface 314, communications module 316, and path 338. Further details of this technique are provided in U.S. patent application Ser. No. 12/263,731 filed Nov. 3, 2008 and entitled "Position Location using Global Positioning Signals Augmented by Broadcast Television Signals," the disclosure thereof incorporated by reference herein in its entirety. Other techniques can be used as well.

In some embodiments, process 700 is repeated one or more times to improve the accuracy of the location determined for femtocell 202. The location of femtocell 202 can be used to acquire precise timing, as described below. The location of femtocell 202 can also be reported to an E911 server for emergency location purposes over Internet 214 via path 338, communications module 316, and network interface 314.

In some embodiments, femtocell 202 measures DTV signals 230, and acquires measurements of DTV signals 230 from femtocell server 240, for each location determination. GPS satellite ephemeris and ionospheric delay change less frequently, and so are acquired less frequently, for example every two hours.

Referring again to FIG. 4, after determining the location of femtocell 202, femtocell 202 then acquires precise time (step 408). In some embodiments, femtocell 202 repeats this precise time acquisition periodically during operation. For example, precise time acquisition can occur once a minute. Precise time acquisition generally requires approximately 30 seconds. The remaining 30 seconds of each minute can be used to repeat precise frequency acquisition (step 410), for example as described above. Of course, other intervals can be used.

Figure 9:
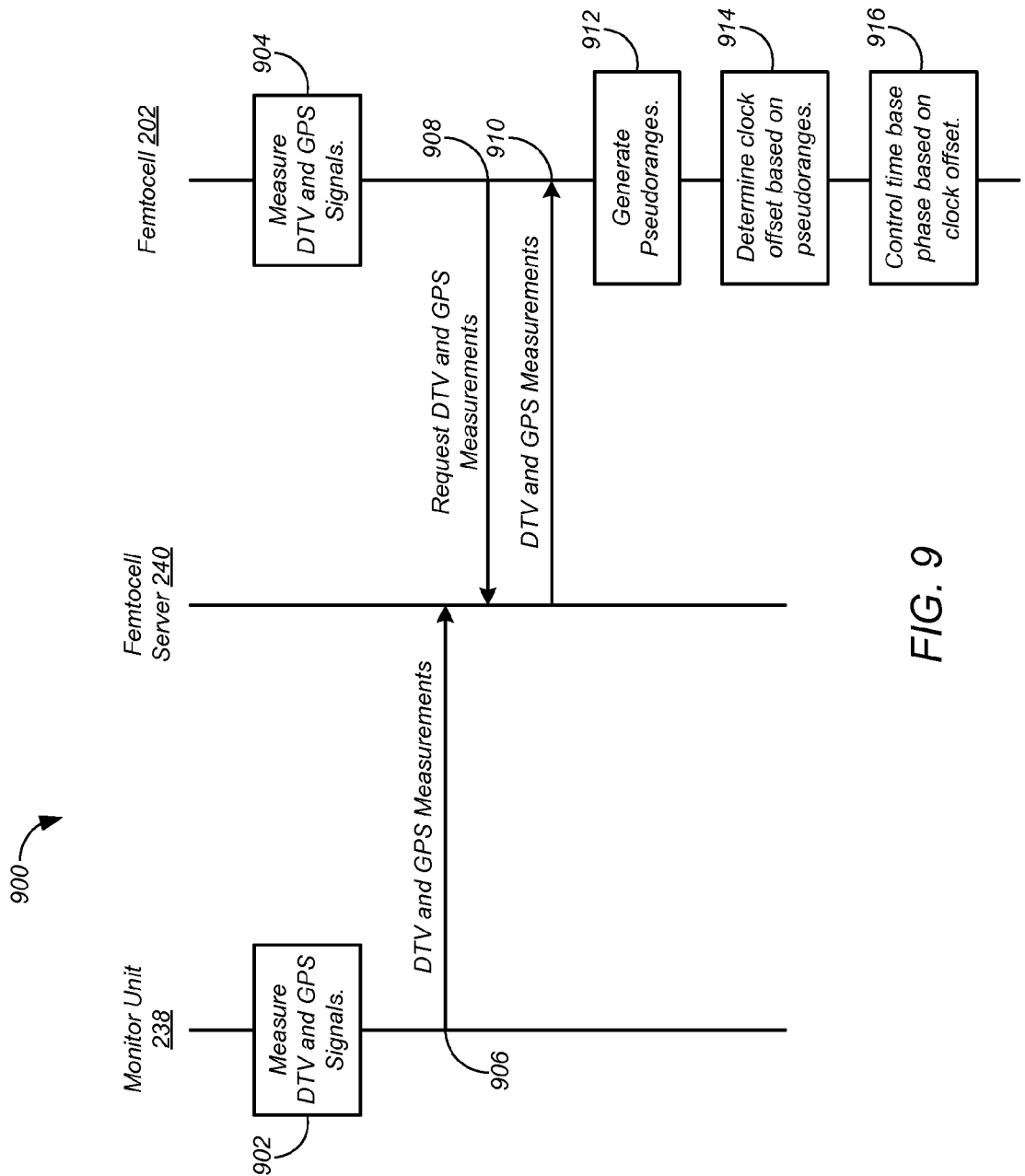
FIG. 9 shows a process for the femtocell of FIGS. 2 and 3 to acquire precise timing according to embodiments of the present disclosure.

FIG. 9 shows a process 900 for femtocell 202 of FIGS. 2 and 3 to acquire precise time according to embodiments of the present disclosure. Although in the described embodiments, the elements of process 900 are presented in one arrangement, other embodiments may feature other arrangements, as will be apparent to one skilled in the relevant arts based on the disclosure and teachings provided herein. For example, in various embodiments, some or all of the steps of process 900 can be executed in a different order, concurrently, and the like.

DTV signals 230 and GPS signals 222 are measured both by monitor unit 238 (step 902) and by measurement module 304 of femtocell 202 (step 904), as described above. Femtocell server 240 acquires the measurements of DTV signals 230 and GPS signals 222 from one or more monitor units 238 (step 906), for example as described above. Femtocell 202 requests the measurements from femtocell server 240 (step 908), which responds by sending the measurements to femtocell 202 (step 910).

After acquiring the measurements of DTV signals 230 and GPS signals 222 from one or more monitor units 238, femtocell 202 determines the precise time based on the measurements of DTV signals 230 and GPS signals 222. In particular, location module 310 generates a respective pseudorange based on each of the signals 230, 222 (step 910), and determines a clock offset based on the pseudoranges (step 912).

Alternatively, femtocell 202 can send the measurements of DTV signals 230 and GPS signals 222 to femtocell server 240, which generates the pseudoranges, determines the clock offset, and sends the clock offset back to femtocell 202.

Each pseudorange represents the time of flight of the respective signal 222, 230 from its transmitter to femtocell 202, as well as the clock offset of clock signals 332. Because the location of femtocell is now known, the time of flight of each signal 222, 230 can be calculated and subtracted from the respective pseudorange to obtain the clock offset. In some embodiments, clock offsets are obtained from multiple signals 222, 230. Receiver Autonomous Integrity Monitoring (RAIM) techniques or the like can be used to obtain a single clock offset from these multiple clock offsets.

Femtocell 202 controls time base module 328 based on the clock offset (step 914). In particular, location module 310 sends one or more clock commands 336 to time base module 328, which adjusts the phase of time base signal 334 based on clock commands 336. Alternatively, or additionally, pseudorange measurements can be used to steer oscillator 308 as well.

Thanks to the acquisition of precise time and frequency, clock signals 332 and time base signal 334 are precise enough for use by wireless mobile telephone transceiver 312 for communications with wireless mobile telephone 216 without interference to other base stations 208 and femtocells 202, and for performing seamless handovers to other base stations 208 and femtocells 202. In operation, wireless mobile telephone transceiver 312 transceives wireless mobile telephone signals 218, for example in communication with one or more wireless mobile telephones 216, based on clock signals 332, and in some cases, based on time base signal 334. Network interface 314 transceives network signals representing wireless mobile telephone signals 218 with Internet 214, which communicates with PSTN 110.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described.

Nevertheless, it will be understood that various modifications may be made without departing from the spirit and scope of the disclosure. Accordingly, other implementations are within the scope of the following claims.

What is claimed is:

1. An apparatus comprising:
    a measurement module adapted to generate measurements of a wireless television signal received by the apparatus and measurements of a wireless satellite positioning signal received by the apparatus;
    a location module adapted to determine a location of the apparatus based on the measurements of the wireless television signal and the measurements of the wireless satellite positioning signal;
    a time module adapted to provide a clock control signal for the apparatus based on at least one of:
        the measurements of the wireless television signal; and
        the measurements of the wireless satellite positioning signal;
    an oscillator adapted to provide one or more clock signals based on the clock control signal; and
    a transceiver adapted to transceive wireless mobile telephone signals based at least one of the clock signals.

2. The apparatus of claim 1, further comprising: a receiver adapted to receive the wireless television signal and the wireless satellite positioning signal.

3. The apparatus of claim 1, further comprising:
    a time base module adapted to provide a periodic time base signal based on one or more of the clock signals;
    wherein the transceiver is further adapted to transceive the wireless mobile telephone signals based on the periodic time base signal.

4. The apparatus of claim 1, further comprising:
    a network interface adapted to transceive network signals representing the wireless mobile telephone signals.

5. A method comprising:
    generating measurements of a wireless television signal received by an apparatus and measurements of a wireless satellite positioning signal received by the apparatus;
    determining a location of the apparatus based on the measurements of the wireless television signal and the measurements of the wireless satellite positioning signal;
    providing a clock control signal for the apparatus based on at least one of:
        the measurements of the wireless television signal; and
        the measurements of the wireless satellite positioning signal;
    providing one or more clock signals based on the clock control signal; and
    transceiving wireless mobile telephone signals based at least one of the clock signals.

6. The method of claim 5, further comprising:
    receiving the wireless television signal and the wireless satellite positioning signal.

7. The method of claim 5, further comprising:
    providing a periodic time base signal based on one or more of the clock signals; and
    transceiving the wireless mobile telephone signals based on the periodic time base signal.

8. The method of claim 5, further comprising:
    transceiving network signals representing the wireless mobile telephone signals.

9. Non-transitory computer-readable media embodying instructions executable by a computer to perform a method comprising:
    generating measurements of a wireless television signal received by an apparatus and measurements of a wireless satellite positioning signal received by the apparatus;
    determining a location of the apparatus based on the measurements of the wireless television signal and the measurements of the wireless satellite positioning signal;
    causing the apparatus to provide a clock control signal for the apparatus based on at least one of:
        the measurements of the wireless television signal; and
        the measurements of the wireless satellite positioning signal;
    causing the apparatus to provide one or more clock signals based on the clock control signal; and
    causing the apparatus to transceive wireless mobile telephone signals based at least one of the clock signals.

10. The non-transitory computer-readable media of claim 9, wherein the method further comprises:
    causing the apparatus to provide a periodic time base signal based on one or more of the clock signals; and
    causing the apparatus to transceive the wireless mobile telephone signals based on the periodic time base signal.

11. The non-transitory computer-readable media of claim 9, wherein the method further comprises:
    causing the apparatus to transceive network signals representing the wireless mobile telephone signals.

* * * * *